United States Patent [19]

Itani et al.

[11] Patent Number: 5,211,927
[45] Date of Patent: May 18, 1993

[54] METHOD FOR STABILIZING ACIDIC AQUEOUS HYDROGEN PEROXIDE SOLUTION CONTAINING COPPER

[75] Inventors: Katsutoshi Itani; Yoko Miyashiro, both of Fuji, Japan

[73] Assignee: Tokai Denka Kogyo Kabushiki Kaisha, Tokyo, Japan

[21] Appl. No.: 798,591

[22] Filed: Nov. 26, 1991

[30] Foreign Application Priority Data

Nov. 27, 1990 [JP] Japan ................................. 2-320787

[51] Int. Cl.$^5$ ........................................... C01B 15/037
[52] U.S. Cl. ..................................... 423/272; 423/584
[58] Field of Search ................................ 423/272, 584

[56] References Cited

U.S. PATENT DOCUMENTS

| | | |
|---|---|---|
| 1,995,063 | 3/1935 | Harris et al. .................. 423/272 |
| 2,012,462 | 8/1935 | Agthe et al. ................... 423/272 |
| 2,091,186 | 8/1937 | Reichert et al. ................ 423/272 |
| 2,426,154 | 8/1947 | Reichert et al. ................ 423/272 |
| 4,040,863 | 8/1977 | Kitamura . |
| 4,497,725 | 2/1985 | Smith et al. ................... 423/272 |
| 4,636,368 | 1/1987 | Pralus . |
| 4,929,301 | 5/1990 | Beechko . |

*Primary Examiner*—Wayne Langel
*Attorney, Agent, or Firm*—Scully, Scott Murphy & Presser

[57] ABSTRACT

An acidic aqueous hydrogen peroxide solution containing copper can be stabilized by adding an amino acid having the formula $$\text{Ar}-\text{CH}_2\overset{\overset{\displaystyle NH_2}{|}}{\text{CH}}\text{COOH}$$

wherein Ar is an aromatic group.

8 Claims, No Drawings

METHOD FOR STABILIZING ACIDIC AQUEOUS HYDROGEN PEROXIDE SOLUTION CONTAINING COPPER

BACKGROUND OF THE INVENTION

The present invention relates to a method for stabilizing an acidic aqueous hydrogen peroxide solution containing copper.

PRIOR ART AND PROBLEMS THEREOF

It is known that an acidic aqueous hydrogen peroxide solution has a high solubilizing ability as a chemical agent for copper and copper alloy materials. And such hydrogen peroxide solution is used widely for pickling, etching and chemical polishing of copper and copper alloy. However, hydrogen peroxide is a compound easy to decompose, and particularly in the presence of copper ion, it decomposes catalytically. Therefore, in the case of using an acidic aqueous hydrogen peroxide solution for chemically dissolving copper and copper alloy, once the copper dissolves and copper ions are accumulated in the solution, the decomposition of the hydrogen peroxide is accelerated, resulting in that the effective utilizability of hydrogen peroxide is deteriorated markedly, which is uneconomical.

Heretofore, for remedying such drawbacks, the addition of various compounds, e.g. phenols and saturated aliphatic alcohols, has been tried, buy for particular purpose of use it is desired to develop a more effective and new stabilizing method. It is object of the present invention to provide a method of stabilizing an acidic aqueous hydrogen peroxide solution by the use of a new additive.

SUMMARY OF THE INVENTION

The present invention resides in a method for stabilizing an acidic aqueous hydrogen peroxide solution containing copper ions which decompose hydrogen peroxide catalytically, characterized by adding to the acidic aqueous hydrogen peroxide solution an amino acid having an aromatic nucleus represented by the following formula:

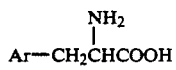

wherein Ar represents an aromatic group.

DETAILED DESCRIPTION OF THE INVENTION

An acidic aqueous hydrogen peroxide solution used for chemically dissolving copper (including copper alloy) usually contains 10 to 150 g/l of hydrogen peroxide and 10 to 200 g/l of an acid. As the acid, sulfuric acid is usually employed, but mineral acids such as nitric acid and phosphoric acid are also useful.

According to the present invention, by the addition of an amino acid having a specific structure, it is intended to prevent hydrogen peroxide from being decomposed by copper ions accumulated in such acidic aqwueous hydrogen peroxide.

The amino acid to be added is of the foregoing general formula, in which the aromatic group of Ar may be a carbon aromatic group or a heterocyclic aromatic group. Preferred examples are phenyl, substituted phenyls such as hydroxyphenyl and alkylphenyl, and indole.

Usually, the additive used in the invention is added 0.01 g/l or more to the acidic aqueous hydrogen peroxide solution. The upper limit is not specially limited, but usually an amount of 50 g/l or less is sufficient. In general, the additive is used in an amount of 0.1 to 10 g/l.

According to the method of the present invention described above, the decomposition of hydrogen peroxide can be suppressed effectively even in the case where copper dissolves and copper ions are accumulated, whereby it is made possible to render the use of an acidic aqueous hydrogen peroxide solution more economical as a chemical copper dissolving agent.

The following working examples and comparative example are given to illustrate the effect of the present invention.

EXAMPLE 1

An amino acid having an aromatic nucleus was added into an aqueous solution held at 50° C. and containing 100 g/l of $H_2O_2$, 150 g/l of $H_2SO_4$ and 159 g/l of $CuSO_4 \cdot 5H_2O$, and the amount of hydrogen peroxide decomposed was determined, the results of which are as shown in Table 1 below.

TABLE 1

| Additive | Amount (g/l) | Amount of Hydrogen Peroxide Decomposed (g-$H_2O_2$/l · min) |
| --- | --- | --- |
| Tyrosine | 10 | 0.11 |
|  | 1 | 0.18 |
|  | 0.1 | 0.32 |
| Phenylalanine | 10 | 0.27 |
|  | 1 | 0.51 |
| Tryptophan | 1 | 0.66 |

COMPARTIE EXAMPLE 1

The substances shown in Table 2 below were added into the same aqueous solution as in Example 1 and the amount of hydrogen peroxide decomposed were determined, the results of which are as shown in the same table.

TABLE 2

| Additive | Amount (g/l) | Amount of Hydrogen Peroxide Decomposed (g-$H_2O_2$/l · min) |
| --- | --- | --- |
| β-Alanine | 10 | 2.3 |
|  | 1 | 3.0 |
| Serine | 10 | 5.5 |
| Cysteine | 10 | 4.1 |
| Aspartic acid | 10 | 4.9 |
| Lysine | 10 | 3.3 |
| Glutamine | 10 | 3.0 |
| Histidine | 10 | 4.5 |
| o-Aminobenzoic acid | 10 | 2.0 |
| not added |  | 4.7 |

From the above tables it is seen that the additives used in the present invention exhibit a remarkably excellent stabilizing effect as compared with other amino acids or analogs thereto.

EXAMPLE 2

The amount of hydrogen peroxide decomposed at 30° C. in an aqueous solution containing 70 g/l of $H_2O_2$, 30 g/l of $HNO_3$, 159 g/l of $CuSO_4 \cdot 5H_2O$ and 1 g/l of tyrosine was 0.22 g/l.min, while the amount of hydrogen peroxide decomposed under the same conditions and without the addition of tyrosine was 6.7 g/l.min. Thus, the amount of hydrogen peroxide decomposed in the presence of tyrosine was only abut 1/30 of that in the absence of tyrosine.

EXAMPLE 3

The amount of hydrogen peroxide decomposed at 60° C. in an aqueous solution containing 100 g/l of $H_2O_2$, 50 g/l of $H_3PO_4$, 159 g/l of $CuSO_4\text{-}5H_2O$ and 10 g/ of phenylalanine was 0.25 g/l.min, while the amount of hydrogen peroxide decomposed under the same conditions and without the addition of phenylalanine was 5.8 g/l.min. Thus, the amount of hydrogen peroxide decomposed in the presence of phenylalanine was only about 1/23 of that in the absence of phenylalanine.

What is claimed is:

1. A method for stabilizing an acidic aqueous hydrogen peroxide solution containing copper ions which decompose the hydrogen peroxide catalytically, characterized by adding to said acidic aqueous hydrogen peroxide solution a stabilizing effective amount of an amino acid having an aromatic nucleus represented by the following formula:

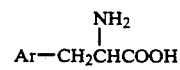

where Ar represents an aromatic group.

2. A method as set forth in claim 1, wherein the hydrogen peroxide concentration and the acid concentration in said aqueous solution are 10 to 150 g/l and 10 to 200 g/l, respectively.

3. A method as set forth in claim 1, wherein the acid is a mineral acid.

4. A method as set forth in claim 1, wherein Ar in the general formula is phenyl, hydroxyphenyl, or alkylphenyl.

5. A method as set forth in claim 1, wherein the amount of the amino acid added is 0.01 to 50 g/l.

6. A method as set forth in claim 1, wherein the amino acid is tyrosine.

7. A method as set forth in claim 1, wherein the amino acid is phenylalanine.

8. A method as set forth in claim 1, wherein the amino acid is tryptophan.

* * * * *